Figure 1:
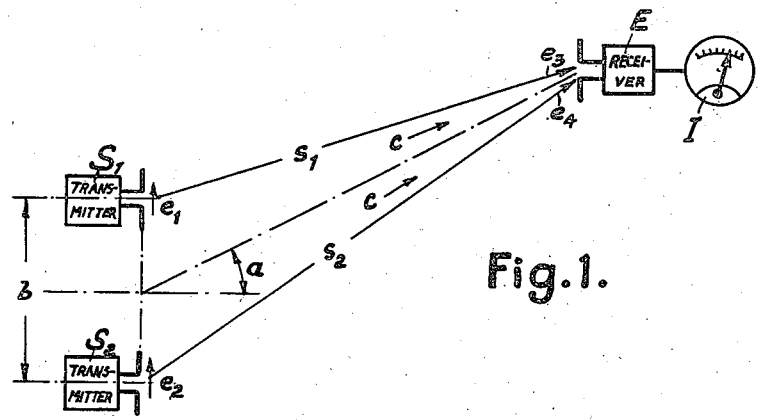

Dec. 31, 1946.　　　　G. GUANELLA　　　　2,413,620
DIRECTION FINDING SYSTEM
Filed June 19, 1940　　　　4 Sheets-Sheet 1

INVENTOR
GUSTAV GUANELLA
BY
ATTORNEY

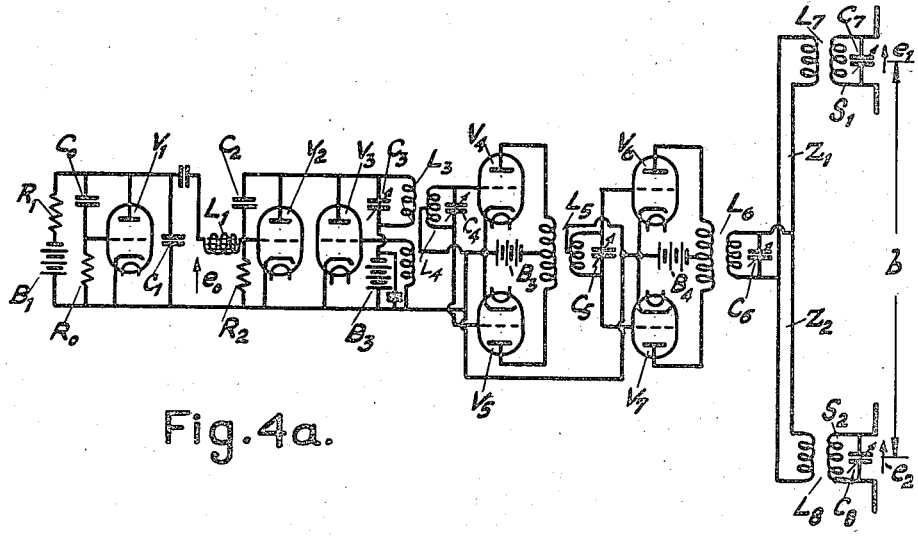
Fig. 4a.
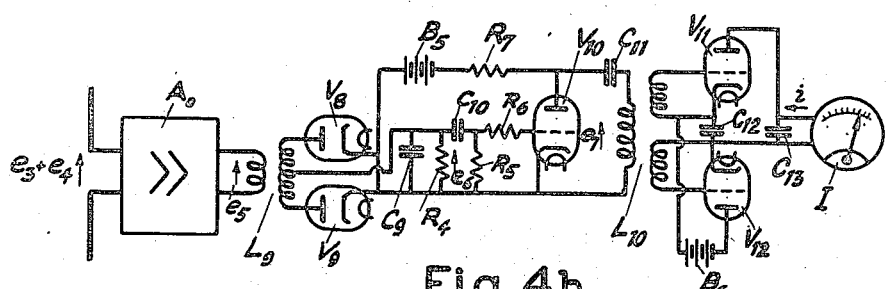
Fig. 4b.
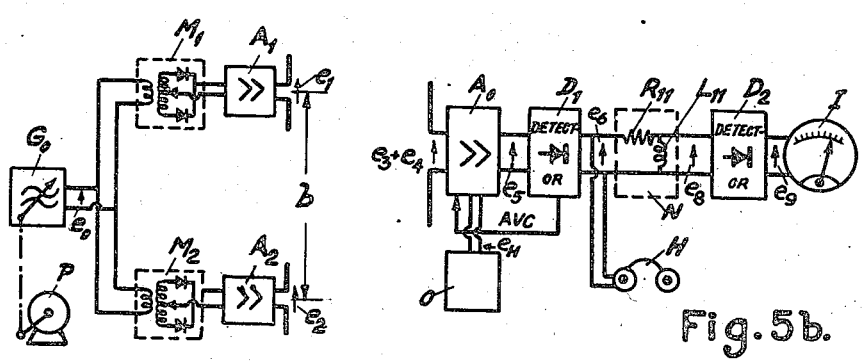
Fig. 5a.
Fig. 5b.

Patented Dec. 31, 1946

2,413,620

UNITED STATES PATENT OFFICE 2,413,620

DIRECTION FINDING SYSTEM

Gustav Guanella, Zurich, Switzerland, assignor, by mesne assignments, to Patents Research Corporation, New York, N. Y., a corporation of New York Application June 19, 1940, Serial No. 341,225
In Switzerland October 16, 1939

6 Claims. (Cl. 250—11)

The present invention relates to a system for and a method of direction finding by means of radiant energy such as acoustic, electro-magnetic or other waves to serve as a navigational aid for guiding moving craft such as ships or airplanes and for other uses.

More specifically, although not limitatively, the invention is concerned with directional systems located at a first preferably fixed point and enabling the use of a simple receiver at a distant preferably moving point for determining the direction between and/or the relative position of said points. Thus, the transmitter may be a ground station and the receiver located on a ship or an airplane in flight.

According to a known method of direction finding of the above general character, the direction between a first point and a distant point whose position it is desired to determine may be found by determining the direction of incidence of radiant energy transmitted by the distant point and by communicating this information to the distant point by special transmitting means. This method is widely used for position and direction finding on board ships and airplanes. A major disadvantage of this method is the fact that special transmitting means are required to communicate the results of the direction determination to the distant point. A further disadvantage is the fact that it is impossible to carry out more than one direction determination at the same time.

According to another method known in the art of radio direction finding, a rotating directional beam is transmitted from a first reference point and the transmitting direction determined at the receiver from the instant of arrival of the signal impulse received during a short time intervals or any other characteristic of the transmitting beam varying according to a pre-arranged schedule as a function of the transmitting direction. This method involves the use of complicated transmitting apparatus including mechanically moving antenna systems and furthermore requires exact calibration and synchronous operation of the receiver. Since the transmitted energy is received during a short time interval only, the system is subject to substantial interference while its accuracy is limited due to the limited concentration or sharpness of the directional beam especially in the case of radio waves.

Accordingly, it is an object of the present invention to substantially overcome the difficulties and shortcomings of the above and other directional methods known in the prior art and to provide a novel method of and system for direction and position finding enabling a direct indication or reading substantially without requiring any manipulations or adjustments on the part of the operator.

Figure 2:
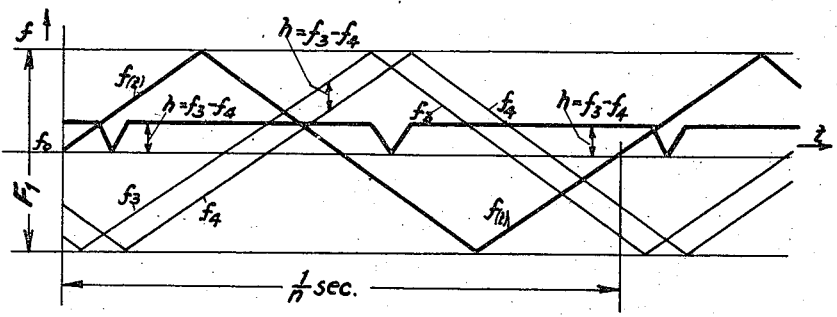
Figure 3:
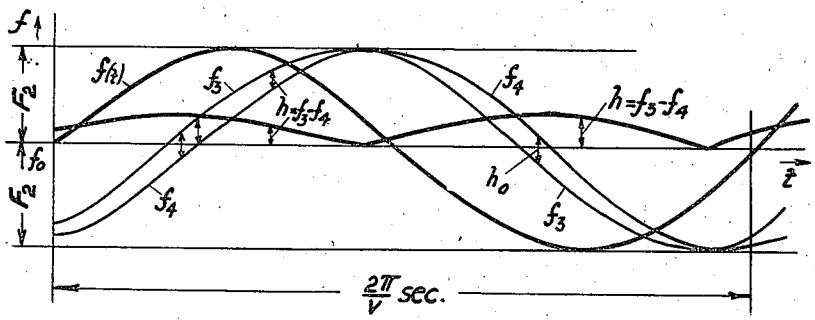
Figure 6A:
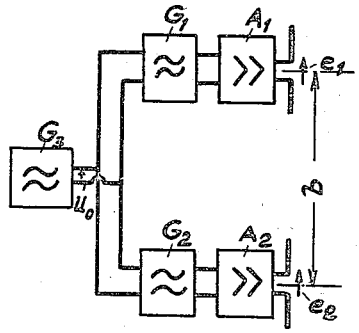
Figure 6B:
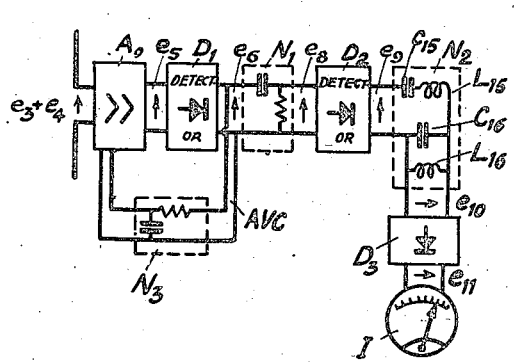
Figure 7:
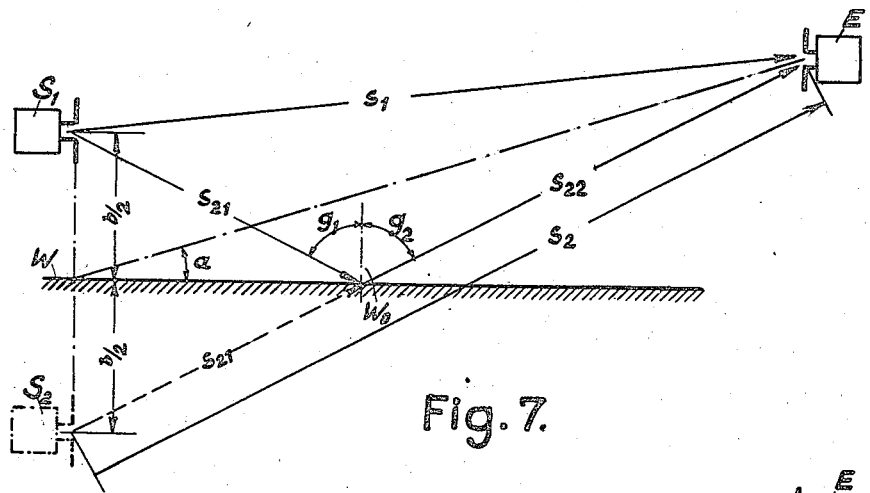
Figure 8:
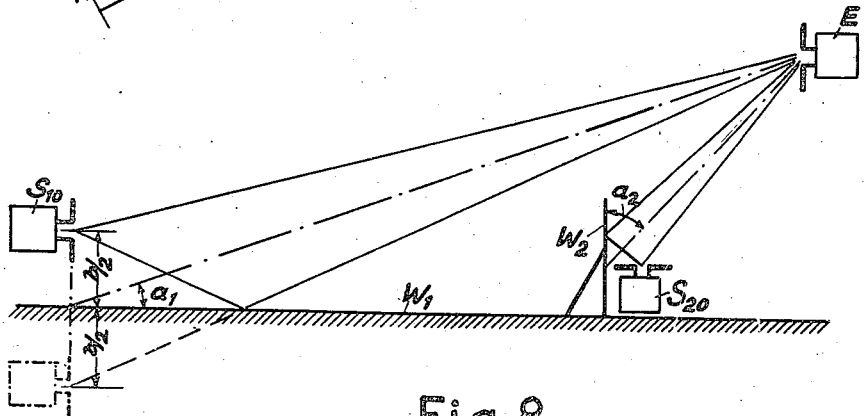
Figure 9:
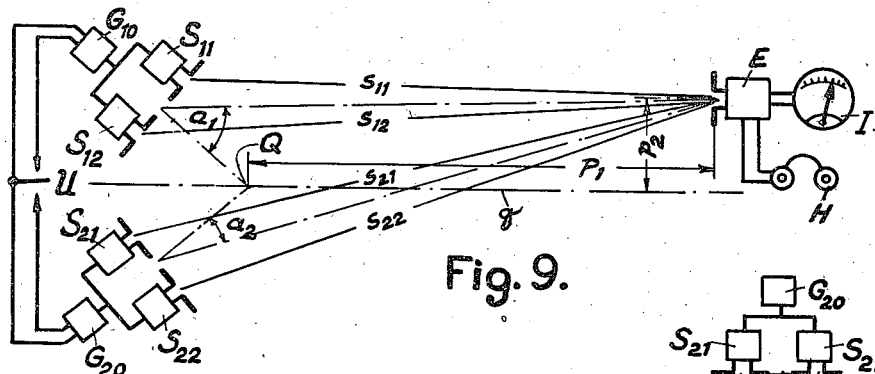
Figure 10:
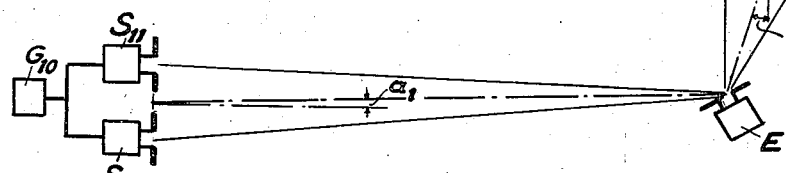
Figure 11:
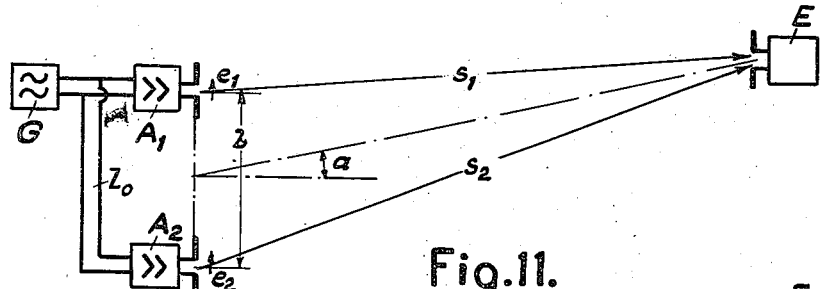
Figure 12:
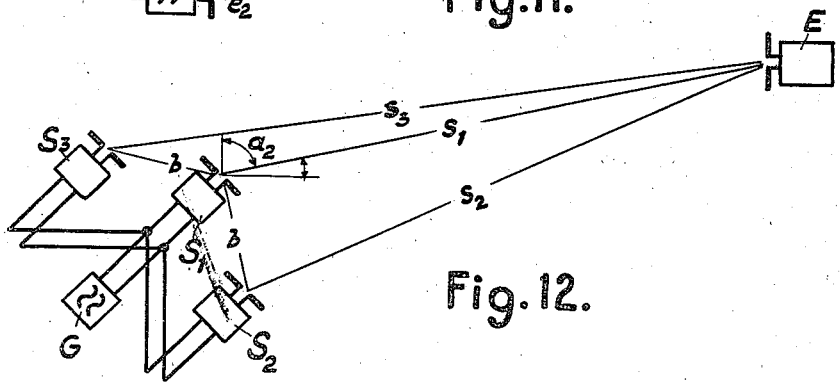

Further objects and aspects of the invention will become more apparent from the following detailed description taken with reference to the accompanying drawings forming part of this specification and wherein:

Figure 1 is a block diagram showing a basic direction finding system embodying the principle of the invention, Figures 2 and 3 are theoretical diagrams explanatory of the function and operation of the invention, Figures 4a and 4b are circuit diagrams of a transmitting and receiving system, respectively, illustration one form of practical embodiment of a direction finding system according to the invention, Figures 5a and 5b are circuit diagrams showing a modification of a transmitting and receiving system, respectively, Figures 6a and 6b show further modifications of a transmitting and receiving system, Figure 7 is a block diagram illustrating a simplified direction finding system according to the invention, Figure 8 shows in block diagram form a direction finding system constructed according to the principle of the invention especially suited for guiding an airplane in effecting a blind landing, Figure 9 is a block diagram illustrating a direction finding system suited to serve as a homing-beacon and a distance indicator for guiding the course of aircraft or other moving vehicle, Figure 10 shows in block diagram form a simple system for position finding utilizing the principle of the invention, Figures 11 and 12 are block diagrams illustrating an improved feature of the invention to eliminate ambiguity of the direction indication.

Like reference characters identify like parts throughout the different views of the drawings.

With the aforementioned and other objects in view the invention contemplates the provision of special transmitting means adapted to transmit radiant energy waves such as radio waves whose frequency varies periodically according to a pre-arranged schedule. The waves are caused to travel to a distant receiver over at least two paths, the difference between which is proportional to the directional angle between the transmitter and receiver with respect to a chosen reference line. Thus, the two received waves will be of different frequency due to the distance in length of the path over which the two waves travel, this difference in frequency being due to the change in frequency at the receiving station during the time interval between the arrival of the first wave travelling over the shorter path and the arrival of the second wave travelling over the longer path. This difference in frequency will constitute an index of the directional angle of the line connecting the transmitter and receiver with respect to a fixed reference line as will become further apparent as the description proceeds.

Referring more particularly to Figure 1, rectangles $S_1$ and $S_2$ represent a pair of transmitters or radiators spaced at a distance $b$ and radiating waves such as electro-magnetic oscillations $e_1$ and $e_2$, respectively. The frequency $f$ of these oscillations is varied simultaneously according to the same pre-arranged schedule; that is, the frequency of the oscillations $e_1$ and $e_2$ being radiated may be expressed mathematically as follows:

$$f_1 = f_2 = f(t) \qquad (1)$$

The waves transmitted arrive at a distant receiver E by way of two paths $s_1$ and $s_2$, respectively, which are of unequal length if the receiver is at a point to the right or left of the bi-secting line at right angle to the base line $b$ of the transmitters. The difference between the paths $s_1$ and $s_2$ is determined by the following formula:

$$s_2 - s_1 = b \sin \alpha \qquad (2)$$

wherein $\alpha$ is the angle subtended by the line connecting the center of the base line $b$ with the receiver E and a line at right angle to the base line $b$.

The difference between the transmitting periods $t_1$ and $t_2$ of the oscillations $e_3$ and $e_4$ arriving at the receiver E is then given by the following formula:

$$t_2 - t_1 = T = \frac{s_2 - s_1}{c} = \frac{b}{c} \sin \alpha \qquad (3)$$

wherein $c$ represents the velocity of propagation of the waves radiated from the transmitters.

The frequencies $f_3$ and $f_4$ of the received oscillations $e_3$ and $e_4$ differ from each other on account of the varying transmitting frequency $f(t)$ and the difference of the transmitting periods. This difference in frequency is expressed as follows:

$$h = f_3 - f_4 = (t_2 - t_1) \cdot \frac{df}{dt} = g \cdot T \qquad (4)$$

wherein the derivative $$\frac{df}{dt} = g(t)$$

of the frequency $f(t)$ during the transmitting period may be regarded as a constant which will be the case in practically carrying out the invention. By combining Equations 3 and 4 the frequency difference is obtained as follows:

$$h = \frac{b}{c} \cdot g(t) \cdot \sin \alpha \qquad (5)$$

The simultaneously received oscillations $e_3$ and $e_4$ are rectified to obtain a beat oscillation having a frequency which corresponds to the difference frequency $h$. This beat frequency is proportional to the directional angle $\alpha$ according to Equation 5 and accordingly may be utilized to effect a direct indication by measurement by means of a suitable instrument I.

If the transmitting frequency $f(t)$ varies linearly about a mean value $f_0$ such as shown in Figure 2, the frequencies $f_3$ and $f_4$ of the received oscillations $e_3$ and $e_4$ delayed in accordance with the transmitting periods $t_3$ and $t_4$, respectively, will also vary according to a linear function whereby the frequency difference $h$ will be constant except for short transition periods at the instants when the transmitting frequency passes through its maximum and minimum, respectively. If the transmitting frequency is varied $n$ times during a second and over a range of $F_1$ cycles embracing a lower and upper limit, then the frequency variation during unit time will be expressed as follows:

$$g = \frac{df}{dt} = 2 \cdot n \cdot F_1 \text{ cycles} \qquad (6)$$

that is, the beat frequency produced by the oscillations $e_3$ and $e_4$ received with a time difference $T = (t_2 - t_1)$ in this case is determined by the following equation in view of Formula 5:

$$h_1 = \frac{2 \cdot b \cdot n \cdot F_1}{c} \sin \alpha = K_1 \sin \alpha \qquad (7)$$

wherein the constant $K_1$ is dependent merely upon the maximum frequency deviation or frequency swing $F_1$, the frequency $n$ of the variations, the known velocity of propagation $c$ and the known distance of the base line $b$ between the transmitters or radiators. Thus, by measuring the beat frequency $h$ by means of a suitable frequency meter I the latter may be calibrated in directional angles $\alpha$ to afford a direct reading direction indication.

As is understood, the invention is not limited to linear variation of the transmitting frequency which may be varied according to any desired periodic schedule. Thus, the transmitting frequency may be varied or modulated sinusoidally about a mean value $f_0$ as shown in Figure 3. In this case the momentary frequency is determined by the following equation:

$$f = f_0 + F_2 \sin vt \qquad (8)$$

and the derivative will be as follows:

$$g = \frac{df}{dt} = F_2 \cdot v \cos vt \qquad (9)$$

The beat frequency produced in the receiver in this case is determined as follows in accordance with Equations 5 and 9:

$$h_2 = \frac{b \cdot F_2 \cdot v}{c} \cos vt \cdot \sin \alpha \qquad (10)$$

that is, in other words, the beat frequency varies between zero and the following limit value:

$$h_0 = \frac{b \cdot F_2 \cdot v}{c} \sin \alpha = K_2 \sin \alpha \qquad (11)$$

wherein the constant $K_2$ again is dependent upon the known frequency deviation $F_2$, the modulating frequency $v$, the velocity of propagation $c$, and the base line $b$ between the radiators. Since the beat frequency $h_2$ varies periodically in the rhythm of the constant modulating frequency $v$, a component $e_9$ may be derived from this beat frequency by selective means whose amplitude varies in direct proportion to the frequency deviation of the beat frequency; that is, in turn in proportion to the directional angle $\alpha$ to be determined. Due to the selective reception of this component which after rectification may serve to energize an indicator the effect of interfering and disturbing signals is substantially eliminated thereby greatly increasing the accuracy and reliability of the direction indication.

Referring to Figure 4a there is shown a transmitting system for radio waves for practicing the invention comprising a pair of radiators $S_1$ and $S_2$ which may be in the form of dipole antennae or the like serving to radiate oscillations $e_1$ and $e_2$ and energized through feeding lines $Z_1$ and $Z_2$ from a common generating system. The latter comprises a feedback master oscillator $V_3$ in the form of a vacuum tube having a tuned plate circuit $C_3$—$L_3$ regeneratively coupled with the grid circuit to generate sustained high frequency oscillations in a manner well understood by those skilled in the art. Item $B_3$ is a source of space current connected to the anode of the tube. The high frequency oscillations produced by this oscillator are amplified in a known manner by means of a power amplifier comprising in the example shown two push-pull stages comprising amplifying tubes $V_4$—$V_5$ and $V_6$—$V_7$, respectively. The common tuned input circuit $L_4$—$C_4$ and the tubes $V_4$—$V_5$ is suitably coupled with the oscillating circuit $C_3$—$L_3$ and the output circuit of the first stage of the power amplifier is coupled to the input of the second stage by way of a push-pull transformer $L_5$ tuned by means of a condenser $C_5$ shunted across its secondary. The output of the power amplifier is impressed upon the feeder lines $Z_1$ and $Z_2$ by way of a further push-pull transformer $L_6$ having its secondary tuned by means of a condenser $C_6$. The radiating antennae are coupled with the feeder lines through transformers $L_7$ and $L_8$ tuned by means of condensers $C_7$ and $C_8$, respectively. Items $B_3$ and $B_4$ are the space current sources for the push-pull stages connected between the cathodes and the center tap of the coupling transformers in a manner well known. If the feeding lines $Z_1$ and $Z_2$ are of equal length, the frequencies of the oscillations $e_1$ and $e_2$ radiated by the antennae will also be equal to and in synchronism with each other.

In order to effect a periodic variation of the transmitting frequency the tuning of the master oscillator is varied continuously and periodically. In the example illustrated there is provided for this purpose a variable reactance electron tube $V_2$ effectively shunted across the tuning condenser $C_3$ of the oscillating tank circuit. The anode and cathode of this tube are connected through a condenser $C_2$ and a resistance $R_2$ in series with the grid of the tube connected to the junction point of this condenser and resistance. In this manner by proper design of the circuit constants the potential applied to the grid of the tube from the oscillating circuit will be in quadrature to the potential at the plate whereby the tube will act as an effective reactance determined by the amplification factor of the tube. The latter is controlled by a potential $e_0$ impressed by way of a high frequency choke coil $L_1$ from a low frequency relaxation oscillator in such a manner as to vary the tuning of the oscillating circuit $C_3$—$L_4$ and in turn the transmitting frequency $f$ in the rhythm and in accordance with the shape of the relaxation oscillations. The latter in the example shown are produced by the aid of a gas filled triode $V_1$ shunted on the one hand by a condenser $C_1$ and on the other hand by battery $B_1$ in series with a resistance $R_1$. In operation, the condenser $C_1$ is periodically charged to a potential equal to the firing potential of the tube $V_1$ and thereafter discharge through the tube. During each discharge period the grid of the tube receives a negative impulse through the condenser $C_0$ connected across the tube in series with a further resistance $R_0$ whereby the extinction of the tube is accelerated and premature ignition is avoided. The thus obtained relaxation potential increases linearly and thereafter decreases rapidly in accordance with a sawtooth pattern whereby the transmitting frequency $f$ varies in a similar manner. As is understood, the acceptance band width or frequency pass range of all the tuned circuits of the transmitter should be designed to be sufficiently wide to prevent suppression or weakening of the extreme transmiting frequencies.

In Figure 4b there is shown a receiving system suited for cooperation with the transmitter described in Figure 4a. The received oscillations $e_3$ and $e_4$ are combined and amplified by means of an amplifier $A_0$ thus yielding a high frequency oscillation $e_5$ whose amplitude varies in the rhythm of the beat frequency $h$. This oscillation is impressed by way of a transformer $L_9$ upon a double diode rectifier circuit comprising diodes $V_8$ and $V_9$ of known design to produce a low frequency potential $e_6$ across the condenser $C_9$ and resistance $R_4$ corresponding at all times to the instantaneous high frequency amplitude and varying in the rhythm of the beat frequency $h$. The potential $e_6$ is applied by way of coupling condenser $C_{10}$ and grid leak resistance $R_5$ to the grid of a low frequency amplifier and limiter $V_{10}$. An additional resistance is connected between the grid of the amplifier $V_{10}$ and the coupling condenser $C_{10}$ whereby this amplifier acts as a limiter to convert the impressed sinusoidal potential into a substantially rectangular potential as understood more clearly from the following. Since the grid of the tube $V_{10}$ due to the grid current passing through the resistance $R_6$ and the voltage drop developed across this resistance is never allowed to become positive, and since furthermore the anode current is completely blocked when the grid becomes highly negative, the anode current flow is restricted by upper and lower limits; that is, the potential impressed from the plate to the primary of the output transformer $L_{10}$ by way of coupling condenser $C_{11}$ and having a frequency corresponding with the frequency $h$ of $e_6$, will assume a rectangular shape with constant positive and negative limit values substantially independently of any incident amplitude variations of the input potential $e_6$. The potential $e_7$ converted from a sinusoidal to a rectangular shape is impressed upon a suitable frequency variation response circuit to produce a current $i$ varying in proportion to the beat frequency $h$ to energize a suitable measuring instrument for direct indication of the direction angle $\alpha$ to be determined. In the example shown this frequency conversion means comprises a pair of triodes $V_{11}$ and $V_{12}$ having both their grids excited by the potential $e_7$ by means of separate secondary windings of coupling transformer $L_{10}$. The cathodes of the tubes are connected through a condenser $C_{12}$, the anode of tube $V_{12}$ is connected to the cathode of the tube $V_{11}$ through a current source $B_6$, and the anode of tube $V_{11}$ is connected to the cathode of the tube $V_{12}$ through a suitable current indicator $I$ shunted by a condenser $C_{13}$. The operation of this conversion and indicating system is as follows: With the potential $e_7$ becoming negative the grid of tube $V_{12}$ will become positive thus rendering this tube conductive and causing a charging of the condenser $C_{12}$ by the battery $B_6$. During the next half cycle of $e_7$ tube $V_{11}$ becomes conductive whereby the condenser $C_{12}$ will be discharge through the instrument $I$. Thus, during each period of the rectangular potential $e_7$ a definite electric charge passes through the indicating instrument. The condenser $C_{13}$ serves to smooth or equalize the discharge currents and to steady the movement of the pointer of the indicating instrument. Accordingly, the average current $i$ passing through the instrument will be proportional to the frequency $h$ of the potentials $e_7$ and $e_6$; that is, in turn to the difference between the travelling paths of the received oscillations $e_3$ and $e_4$, respectively. Thus, by suitable calibration of the instrument I the directional angle $\alpha$ can be instantly ascertained by a direct indication.

If very high frequencies are used difficulties may be encountered in feeding the energies to the radiators $S_1$ and $S_2$. In such cases a low frequency potential $e_0$ may be utilized produced by a common generator $G_0$ as shown in Figure 5a and transmitted to the radiating stations. At the latter the low frequency potential is stepped up to the desired high frequency by means of frequency multipliers $M_1$ and $M_2$ of any known type and construction, additionally amplified by means of amplifiers $A_1$ and $A_2$ and then radiated in the form of high frequency oscillations $e_1$ and $e_2$ in a manner similar to that described hereinbefore. The periodic frequency variation may be effected by varying the frequency $e_0$ of the common oscillator in any suitable manner purely electrically as described or by continuously rotating a variable tuning element (condenser) by means of a motor P as indicated schematically in the drawings. By suitably matching the transmitting channels, frequency multipliers and amplifiers, the variable frequencies $f_1$ and $f_2$ of the radiated oscillations $e_1$ and $e_2$ will be in exact synchronism with each other. In order to obtain a desired variation of the frequency such as a sinusoidal variation, the plates of the tuning condenser rotated by the motor P may be suitably shaped as is readily understood.

In Figure 5b there is shown a modified receiving system wherein the received oscillations $e_3$ and $e_4$ are combined in a receiver or amplifier $A_0$ with a constant local oscillation $e_h$ generated by a local oscillator O to obtain a combined intermediate frequency oscillation $e_5$ having an amplitude varying in the rhythm of the beat frequency $h$. This intermediate frequency potential is rectified by means of a rectifier $D_1$. In order to render the reception independent of the amplitude or strength of the received oscillations, there is provided an AVC system connected between the detector $D_1$ and the amplifier $A_0$ whereby a control potential proportional to the amplitude of the received oscillations is impressed upon a gain control element of the amplifier $A_0$ in such a manner as to maintain a constant average amplitude of the potential $e_6$ supplied by the output of the detector $D_1$. The potential $e_6$ whose frequency in case of linear variation of the transmitting frequency according to Equation 7 is proportional to the sine of the transmitting angle $\alpha$ is applied to a frequency conversion or response network N comprising in the example shown a series resistance $R_{11}$ and a parallel inductance $L_{11}$. By proper design of the latter there is obtained at the output of the network N an alternating potential $a_8$ having an amplitude proportional to the frequency of $e_6$. By rectification of this potential in a detector $D_2$ there is obtained a direct potential $e_9$ which is proportional to the frequency $h$ of the potential $e_6$, i. e. in turn to the directional angle $\alpha$. This potential is suitably measured by an instrument I which may be directly calibrated in angles $\alpha$ to afford an instantaneous direction indication.

In many cases a simultaneous subjective reception of the beat frequency is desired. For this purpose a pair of head phones may be connected ahead of the network N by means of which the beat frequency may be ascertained provided it falls within the audible range.

According to a further modification, the high frequency oscillations $e_1$ and $e_2$ may be generated by separate transmitters at the radiating points as shown in Figure 6a. The tuning of the high frequency generators $G_1$ and $G_2$ in this case is varied simultaneously in accordance with a control potential $u_0$ produced by a low frequency generator $G_3$ in such a manner that the frequencies of both oscillations $e_1$ and $e_2$ which are further amplified by means of amplifiers $A_1$ and $A_2$, respectively, are constantly varied periodically and in an equal manner. The control potential $u_0$ may serve to excite the grid of a variable reactance tube in a manner similar as shown in Figure 4a to effect a corresponding variation of the transmitting frequency or any other suitable tuning control may be employed. Since the transmission of the low frequency potential $u_0$ to the radiating points does not offer any practical difficulties, arrangements of this type are specially suited in cases where the radiators are spaced by a comparatively large distance or base line $b$. Thus, if the auxiliary potential $u_0$, varies according to a sinusoidal function the transmitting frequencies will also vary sinusoidally about a mean value and in turn the beat frequency obtained in the receiver will vary between zero and a maximum $h_0$ in accordance with Formula 10 as shown in Figure 3.

In the latter case, that is where the transmitting frequency is varied according to a sinusoidal or any other non-linear periodic function a receiver may be used as shown in Figure 6b. In the latter, the received high frequency oscillations $e_3$ and $e_4$ after amplification by means of amplifier $A_0$ yield a combined high frequency oscillation $e_5$ applied to a first detector $D_1$ in a manner similar as described in Figure 5b resulting in a low (intermediate) frequency oscillation $e_6$ whose frequency corresponds to the beat frequency. In order to maintain the amplitude of the potential $e_6$ substantially constant the direct current component of $e_6$ is applied through an AVC channel including a suitable smoothing filter $N_3$ to a gain control element of the amplifier $A_0$ in a manner substantially similar to that described hereinabove. The potential $e_6$ of varying frequency is impressed upon a frequency responsive network $N_1$ comprising in the example shown a series condenser and a parallel resistance whereby there is obtained at the output of this network a low frequency potential $e_8$ whose amplitude is an index for the frequency $h$ of $e_6$. Since this frequency according to Formula 10 varies periodically in the rhythm of the modulating frequency $v$ the potential $e_9$ derived from $e_8$ by further rectification by means of detector $D_2$ varies periodically in the same rhythm in such a manner that the maximum amplitude of $e_9$ increases in proportion to an increase of the beat frequency $h$. The potential $e_9$ is impressed upon a selective network $N_2$ comprising in the example shown a series resonant circuit $L_{15}$—$C_{15}$ and a parallel tuned circuit $L_{16}$—$C_{16}$. The network $N_2$ is suitably designed in such a manner as to obtain a variable component $e_{10}$ at its output which in turn is rectified in a detector $D_3$ to yield a final potential $e_{11}$ energizing an ordinary current indicator I. The latter indicates the amplitude of the potential $e_{10}$ corresponding to the maximum values $e_8$ i. e. to the maximum beat frequencies $h_0$. By suitably calibrating the instrument, the transmission angle $\alpha$ can be read directly on the scale of the instrument. Due to the selective transmission of the potential $e_9$ through the filter $N_2$ all disturbing frequencies and interfering components are substantially suppressed whereby this system becomes highly selective and accurate with comparatively small receiving signals. As is understood a selective measurement of the component $e_9$ may be effected by other means well known in the art.

Referring to Figure 7 there is shown a simplified modification of the invention requiring only a single radiator $S_1$ for transmitting the frequency modulated oscillations whereby a second transmission path $s_{21}+s_{22}$ different from the direct transmitting path $s_1$ is obtained by the provision of a reflecting surface W. Since the angle of incidence $g_1$ and the reflecting angle $g_2$ for the oscillation reflected at the point $W_0$ are equal to each other, the reflected oscillation will travel over the same path $s_2$ as if it would emanate from a radiating point $S_2$ located at a point forming the mirror image of the radiator $s_2$ with respect to the reflecting surface W as indicated in dotted lines in the drawings. Thus, the difference in the travelling path $s_{21}+s_{22}-s_1$ determined by measuring the difference between the frequencies of the received oscillations, in this case too will be proportional to the sine of the transmitting angle $\alpha$. In arrangements of this type all problems and difficulties of a common control or synchronization of two separate transmitters or radiators are substantially avoided and the realization of the inventive method is enabled with a minimum of apparatus required. In addition to the transmitter $S_1$ whose frequency is varied periodically, all that is required is a reflecting surface W which in many cases may be already existent. The reflecting surface may have the form of a metallic layer of sufficient extension or a wire net whose meshes are small compared with the wave length used. In many cases natural reflecting surfaces may be utilized such as a water surface or the surface of the earth itself.

The method and arrangement shown in Figure 7 is well suited for guiding a plane above an airport and as a navigational aid to assist a pilot in effecting a landing. Thus, according to Figure 8 the elevational angle $\alpha_1$ of a plane at the point of the receiver E can easily be ascertained by the aid of a transmitter or radiator $S_{10}$ at a height $$\frac{b}{2}$$

above the landing field in a manner substantially similar to that described in connection with Figure 7. A further transmitter $S_{20}$ also operated with a variable frequency net is arranged in front of a vertical reflecting surface, preferably a wire net or wall $W_2$ for indicating the zenithal angle $\alpha_2$ which latter decreases rapidly as the airplane approaches the wall $W_2$, thus furnishing the pilot with information as to his position relative to and above the landing field and enabling him to safely land during conditions of poor visibility or to effect what is known as a blind landing.

In order to effect a direction determination in multiple arrangements of the type shown in Figure 8 without ambiguity different frequency ranges may be employed for the separate transmitters. In this case either separate specially tuned receivers may be used or a common receiver whose tuning is adjusted alternately to the different transmitting ranges. Alternatively, the same frequency range may be used for all transmitters by alternately and successively connecting the transmitters in rotation. In the latter case only a single receiver is required which alternately indicates the separate directional angles $\alpha_1$ and $\alpha_2$, etc. In order to identify the separate transmitters it is advantageous to use unequal transmitting periods in such a manner that transmitter $S_{10}$ may be connected during a longer interval than the transmitter $S_{20}$ and any additional transmitters used are connected during still shorter transmitting periods.

Referring to Figure 9 there is illustrated a further embodiment of the invention suited as a homing-beacon and distance indicator for guiding a moving vehicle in particular an airplane towards a place of destination, such as an airport. According to this modification there are provided two transmission groups $S_{11}$—$S_{12}$ and $S_{21}$—$S_{22}$, respectively, each provided with a common generator $G_{10}$ and $G_{20}$ such as according to Figure 5a or 6a. These transmitter groups are alternately connected by means of a distributor or interrupter U. In an arrangement of this type the beat frequency in the receiver E will be equal for both groups if the receiver is at a point coinciding with the bi-secting line $q$ between the transmitters since in this case the angles $\alpha_1$ and $\alpha_2$ are equal to each other. These angles $\alpha_1$ and $\alpha_2$ will decrease as the distance $p_1$ of the receiver from the point Q at the intersection of the symmetry lines for the transmitter groups $S_{11}$—$S_{12}$ and $S_{21}$—$S_{22}$ between the transmitters becomes less; that is, the distance $p_1$ may be determined directly by measuring the average beat frequency. A lateral deviation $p_2$ from the bi-secting line $q$ will result in a corresponding difference between the angles $\alpha_1$ and $\alpha_2$ and in turn a difference between the two beat frequencies whereby such deviation may be at once ascertained and corrected by the pilot to maintain the course towards his destination known as a homing flight. A system of this type is further suited for blind landing in that in addition to the direction the average beat frequency, indicated by the instrument I, may be used to inform the pilot of his distance from the transmitter and in particular to point where to commence a landing operation. The control of the lateral deviation $p_2$ may be effected by ascertaining the difference between the beat frequencies in a head phone receiver H connected after the first rectifier in the manner as shown in Figure 5b.

In order to discriminate between the two transmitter groups, the group $S_{11}$—$S_{12}$ may be connected during a short period while the group $S_{21}$—$S_{22}$ is connected during longer periods. Alternatively, the connection may be effected in an interlocking manner in accordance with the letters $n$ and $a$ of the Morse alphabet. In the latter case if the aircraft deviates to the right or left from the bi-secting line $q$, a change of the pitch of the beat note is observed in such a manner that the letter $a$ is heard at a higher pitch and the letter $n$ at a lower pitch or vice versa. If the plane follows the bi-secting or homing course, a continuous note of constant frequency or pitch is heard. If the instrument I has sufficient inertia its indicating pointer will not follow the rapid frequency fluctuations whereby the average beat frequency indicated will be directly proportional to the distance $P_1$ from the transmitter thus enabling a direct calibration of the instrument in units of distance travelled.

Referring to Figure 10, there is shown an arrangement for position finding of a receiving station E which may be located at an aircraft or ship utilizing the principle of the invention. There are provided for this purpose at least two transmitters or groups of transmitters $S_{11}$—$S_{12}$ and $S_{21}$—$S_{22}$ located at points separated from each other. These transmitters may operate with separate frequency ranges or intermittently with the same frequency range. The directional angle $\alpha_1$ is determined by measuring the beat frequency between the oscillations transmitted by $S_{11}$—$S_{12}$ and the directional angle $\alpha_2$ is determined by measuring the beat frequency of the oscillations transmitted by $S_{21}$—$S_{22}$. If the location of the transmitters is known the position of the receiver E may be determined in a simple manner by finding the intersection of the directional lines from the transmitters (triangulation method).

As is understood, the direction and position finding systems according to Figures 9 and 10 may use a single transmitting or radiators $S_{12}$ and $S_{21}$ in combination with suitable reflecting surfaces in place of the double transmission systems shown in the drawings. Moreover, the direction or position determination according to Figure 8 may be effected without special reflecting surfaces by using spaced radiators or transmitters operating with the same frequency in accordance with the invention.

In the arrangements according to Figures 4 to 6 the frequencies of the oscillations $e_1$ and $e_2$ radiated by the transmitters are substantially equal to each other. Since the polarity of the beat frequency has not practical significance, a positive and negative directional angle $\alpha$ i. e. on either side of the bi-secting line which will result in the same direction indication. According to a further feature of the invention, in order to avoid this ambiguity, the oscillations are transmitted with a predetermined time delay $T_0$. In this case the total difference in travelling times between the received oscillations as expressed by Formula 3 will be modified as follows:

$$t_2 - t_1 = T = T_0 + \frac{s_2 - s_1}{c} = \frac{b}{c} \sin \alpha \qquad (12)$$

whereby in turn the beat frequency will be as follows:

$$h = f_3 - f_4 = T \cdot g = \left(T_0 + \frac{b}{c} \sin \alpha\right) \cdot g(t) \qquad (13)$$

Thus, in case of linear variation of the frequency, the beat frequency in view of Formula 6 may be expressed as follows:

$$h_3 = 2nF_1\left(T_0 + \frac{b}{c} \sin \alpha\right) \qquad (14)$$

The time delay $T_0$ may be effected for instance by transmission over a feeder line having a length $b_0$ and a propagation transmission $c_0$ in which case the delay will be as follows:

$$T_0 = \frac{b_0}{c_0} \qquad (15)$$

Thus, by a special design of the length $b_0$, the following condition may be fulfilled for a given value of $c_0$:

$$\frac{b_0}{c_0} = \frac{b}{c} \qquad (16)$$

This is the case for instance when $c_0 = c$, and if $b_0 = b$ in which case Formula 14 is modified as follows:

$$h = \frac{b}{c} g(t) \cdot (1 + \sin \alpha) \qquad (17)$$

and in case of linear frequency variation:

$$h_3 = \frac{2 \cdot b \cdot n \cdot F_1}{c} \cdot (1 + \sin \alpha) = K_1 \cdot (1 + \sin \alpha) \qquad (18)$$

It can be easily seen that this beat frequency will assume different values for all directional angles $\alpha$ between 0° and 180° that is, the ambiguity inherent in Formulae 5, 7 and 10 is substantially eliminated in this manner. The difference in the transmission periods according to Figure 11 may be obtained by feeding the high frequency oscillations of varying frequency directly from the generator G to the amplifier $A_1$ of the first transmitting or radiating station while the second transmitting station is fed through a Lecher wire system $Z_0$, the length of which with a speed of propagation $c_0 = c$ corresponds to the base $b$ between the transmitting stations thereby fulfilling Equations 16, 17 and 18.

A certain ambiguity still exists in the latter case inasmuch as a directional angle $\alpha$ and an angle $180° - \alpha$ will result in similar beat frequencies. In order to eliminate this ambiguity, a plurality of transmitters may be employed arranged in the manner shown in Figure 12 i. e. with the transmitters or radiators located at points other than upon a straight line. If the transmitters are energized in the same manner such as shown in Figure 11, and if the base lines between the transmitter groups $S_1$—$S_2$ and $S_1$—$S_3$ form a right angle, the beat frequencies originating from the first and second transmitter group will yield separate measuring results as follows:

$$x_1 = \sin \alpha_1 \qquad (19)$$

$$x_2 = \sin \alpha_2 = \cos \alpha_1 \qquad (20)$$

From these measurements the actual angle $\alpha_1$ which may lie within 0° and 360° can be positively determined without ambiguity. In order to carry out such a measurement, the transmitters $S_1$ and $S_3$ may be operated alternately while $S_1$ transmits continuously.

As pointed out hereinbefore the radiant energy used for direction finding purposes according to the invention may be of any desired character such as in the form of radio waves or acoustic waves which latter may be within or above the audible range. The oscillations of varying frequency may be transmitted directly through a suitable medium or by the aid of a separate carrier wave of constant high frequency modulated in any desired manner. In the latter case a separate demodulator is required in the input stage of the receiver as is understood by those skilled in the art.

The method and system proposed by the invention is especially suited for direction and/or distance measurement by direct reading or indication. Alternatively, the output current or potential may serve for operating a control mechanism such as a steering mechanism of a moving vehicle to automatically maintain the vehicle at a predetermined course; that is, the invention may serve for use as an automatic pilot for guiding a ship, airplane or other moving craft. According to an alternative method, the beat frequency varying proportionately to the distance is split into two or more phases in any suitable manner, such as by a 90° phase shifting circuit and the split phases caused to produce a rotary magnetic field actuating a rotor whose speed will be proportionate to the distance to be determined and may be measured or indicated in any suitable manner.

It will be evident from the foregoing that the invention is not limited to the specific circuits, arrangements of parts and the steps described and disclosed herein for illustration, but that the novel underlying thought and principle of the invention are susceptible of numerous variations and modifications differing from the specific embodiments shown and disclosed and coming within the broader scope and spirit of the invention as defined by the appended claims. The specification and drawing are accordingly to be regarded in an illustrative rather than a limiting sense.

I claim:

1. In a direction finding system, a radiator transmitting radiant energy located at a first point, a reflecting surface arranged in relatively fixed spaced relation to said radiator, a receiver located at a distant point, whereby energy is transmitted to said receiver both over a direct path from said radiator and over an indirect path by way of reflection by said surface, means for periodically varying the frequency of the energy transmitted according to a predetermined schedule, means associated with said receiver for producing beat energy from the energies received over said separate paths, the frequency of said beat energy varying according to the directional angle of the line connecting the point of said surface directly opposite to said radiator and said receiver with respect to a fixed reference line, and means for utilizing the beat frequency as an index of said directional angle.

2. In a radio direction finding system, a transmitting antenna, a reflecting surface arranged in relatively fixed spaced relation to said antenna, a receiver located at a distant point, means for radiating electric waves from said antenna whereby said waves arrive at said receiver both over a direct path from said antenna and an indirect path by way of reflection by said surface, means for periodically varying the frequency of the waves radiated according to a predetermined schedule, means associated with said receiver for producing a beat signal from the waves received over the separate paths, and means for utilizing the frequency of said beat signal as an index of the directional angle of the line connecting the point on said surface directly opposite to said antenna with said distant point with respect to a fixed reference line.

3. In a radio direction finding system, a radiator located at a first point, a reflecting surface arranged in spaced relation to said radiator, a receiver located at a distant point, means for radiating electric waves from said radiator whereby said waves travel to said receiver both over a direct path from said radiator and an indirect path by way of reflection by said surface, means for sinusoidally varying the frequency of the waves radiated, means associated with said receiver for producing a beat signal from the waves received over said separate paths, said beat signal having a frequency periodically varying between zero and a maximum according to the directional angle of the line connecting the point on said surface directly opposite to said radiator with said receiver with respect to a fixed direction, frequency response means for converting said beat signal of varying frequency into a signal current having an amplitude varying in proportion to the beat frequency, selective means for segregating from said last current a predetermined frequency component, and means for utilizing said last component as an index of said directional angle.

4. In an elevational radio direction finding system, a radiator relatively fixedly located above ground, a receiver located on an aircraft in flight whereby energy is transmitted to said receiver both over the direct path from said radiator and over an indirect path by way of reflection from the ground surface, means for periodically varying the frequency of the energy transmitted according to a predetermined schedule, means associated with said receiver for producing beat energy from the energies received over said separate paths, the frequency of said beat energy varying according to the elevational angle of said receiver, and means for utilizing said beat frequency as an index of said elevational angle.

5. A system for navigating an aircraft toward a carrier-wave reflecting surface comprising, a carrier-wave radiating system relatively fixedly supported in spaced relation above said carrier-wave reflecting surface, means for applying a frequency-modulated carrier wave to said radiating system for radiation therefrom, means carried by said aircraft and adapted to receive the carrier wave radiated by said radiating system and responsive to the difference frequency of carrier-wave energy traveling directly and by reflection from said carrier-wave reflecting surface to said receiving means for deriving a control signal, said radiating system having the characteristic that equal-valued control-signal loci are represented by geometric surfaces of revolution fixed relative to said radiating system, and means for utilizing said control signal to aid in the navigation of said aircraft along a desired course approaching said reflecting surface.

6. A system for navigating an aircraft toward a carrier-wave reflecting surface comprising, a carrier-wave radiating system relatively fixedly supported in spaced relation above said carrier-wave reflecting surface, means for applying a frequency-modulated carrier wave to said radiating system for radiation therefrom, means carried by said aircraft and adapted to receive the carrier wave radiated by said radiating system and responsive to the difference frequency of carrier-wave energy traveling directly and by reflection from said carrier-wave reflecting surface to said receiving means for deriving a control signal, said radiating system having the characteristic that equal-valued control-signal frequency loci are represented by geometric surfaces of revolution fixed relative to said radiating system, and means for utilizing said control signal to aid in the navigation of said aircraft along a desired course approaching said reflecting surface.

GUSTAV GUANELLA.